(12) United States Patent
Ohtsuka

(10) Patent No.: US 8,712,231 B2
(45) Date of Patent: Apr. 29, 2014

(54) CAMERA BODY, AND CAMERA SYSTEM

(75) Inventor: Yoshio Ohtsuka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/486,199

(22) Filed: Jun. 1, 2012

(65) Prior Publication Data

US 2012/0308220 A1   Dec. 6, 2012

(30) Foreign Application Priority Data

Jun. 6, 2011   (JP) ................... 2011-125979

(51) Int. Cl.
  *G03B 17/24*   (2006.01)
(52) U.S. Cl.
  USPC .......................................................... 396/312
(58) Field of Classification Search
  USPC .......................................................... 396/312
  See application file for complete search history.

(56) References Cited

U.S. PATENT DOCUMENTS

| 4,807,051 A | 2/1989 | Ogura |
| 6,130,994 A * | 10/2000 | Maruyama ...................... 396/60 |
| 2002/0064287 A1 | 5/2002 | Kawamura et al. |
| 2009/0245777 A1 * | 10/2009 | Shibuno et al. ............... 396/104 |
| 2010/0110232 A1 * | 5/2010 | Zhang et al. ............... 348/240.3 |
| 2011/0063461 A1 * | 3/2011 | Masuda .................... 348/208.11 |

FOREIGN PATENT DOCUMENTS

| JP | 62-149295 | 7/1987 |
| JP | 8-182091 | 7/1996 |
| JP | 11-341592 | 12/1999 |
| JP | 2010-157965 | 7/2010 |
| JP | 2010-200253 | 9/2010 |
| JP | 2010-226412 | 10/2010 |

* cited by examiner

*Primary Examiner* — Clayton E Laballe
*Assistant Examiner* — Dennis Hancock
(74) *Attorney, Agent, or Firm* — Panasonic Patent Center

(57) ABSTRACT

A camera body to which an interchangeable lens capable of changing zoom magnification is mountable. The camera body includes a sound pickup section that picks up sounds to generate audio data and a sound processor that changes settings relating to directionality of the sound pickup section in conjunction with the zoom magnification of the interchangeable lens. When the interchangeable lens is positioned to provide the minimum magnification of zoom, the sound processor sets the directionality of the sound pickup section to a directionality by which sounds in the widest region can be picked up based on the zoom range information. When the interchangeable lens is positioned to provide the maximum magnification of zoom, the sound processor sets the directionality of the sound pickup section to a directionality by which sounds in the narrowest region can be picked up based on the zoom range information.

7 Claims, 8 Drawing Sheets

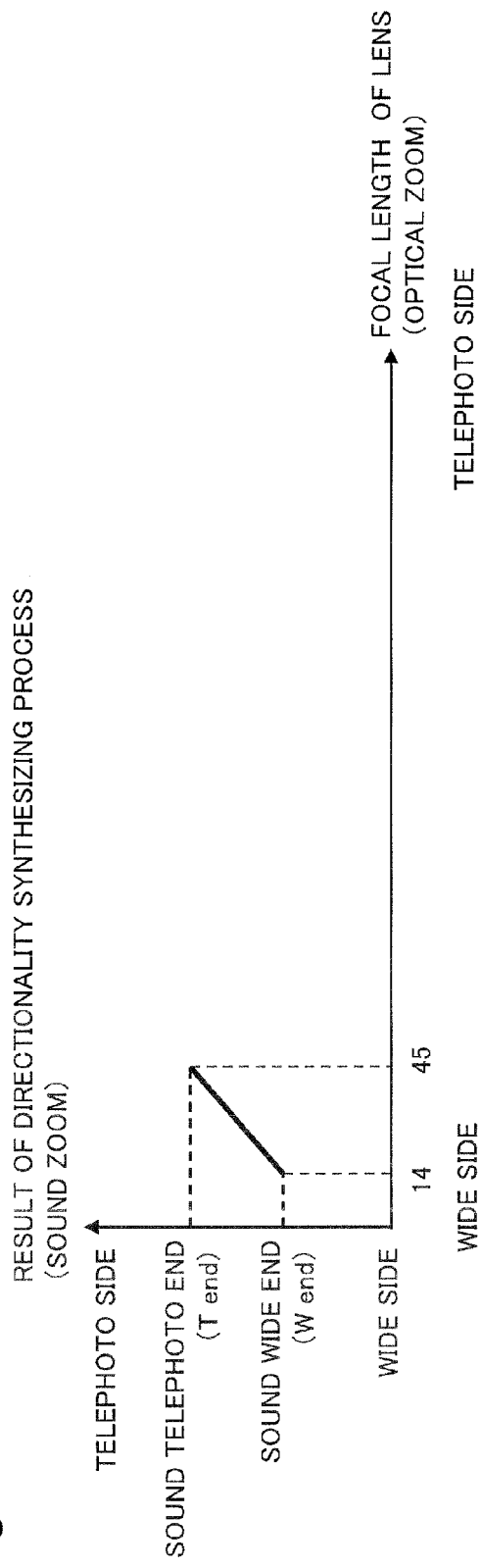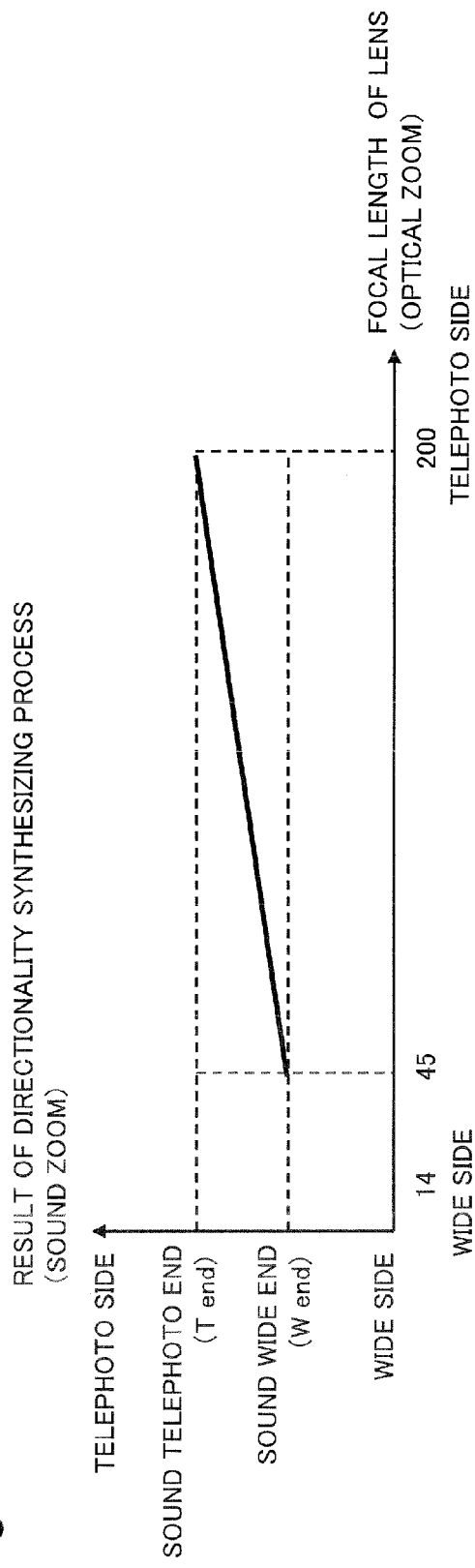

CAMERA BODY, AND CAMERA SYSTEM

BACKGROUND

1. Technical Field

The art disclosed herein relates to a camera body having an audio recording function and an interchangeable lens mountable to the camera body.

2. Related Art

In recent years, an imaging apparatus that can record image data as well as audio data is being widely used. In such an imaging apparatus having such an audio recording function, an art, which realizes a function for adjusting microphone directionality based on information about focal length (zoom position) of lens so as to change a sound pickup range (sound zoom function), is known (for example, see JP08-182091A). Further, in a lens interchangeable-type imaging apparatus, an art, which controls microphone directionality based on information about a focal length of an interchangeable lens, is known (for example, see JP2010-200253A).

The conventional imaging apparatus described in JP2010-200253A determines a level of microphone directionality based on the set focal length of the interchangeable lens regardless of the range of the focal length settable in the mounted interchangeable lens. For this reason, some types of the interchangeable lenses mounted to the imaging apparatus have a problem such that a user has difficulty in sensing the sound zoom (sound zoom effect). This is because the imaging apparatus disclosed in JP2010-200253A determines the range of changing the directionality depending on the range of the focal length of the interchangeable lens. That is to say, when a lens of which focal length range is small is mounted, the range of changing the directionality becomes smaller than the case where a lens whose focal length range is large is mounted.

SUMMARY

In order to solve the above problem, a camera body and an interchangeable lens are provided that can allow a user to sense a sound zoom effect more surely regardless of a type of an interchangeable lens (focal length).

In a first aspect, there is provided a camera body to which an interchangeable lens capable changing zoom magnification is mountable. The camera body includes a receiving section that receives zoom range information which is information indicating a range of a zoom magnification that can be provided by the interchangeable lens from the interchangeable lens, a sound pickup section that picks up sounds to generate audio data, and a sound processor that changes settings relating to directionality of the sound pickup section in conjunction with the zoom magnification of the interchangeable lens. The zoom range information includes information corresponding to maximum magnification and minimum magnification that can be provided by the interchangeable lens. The directionality of the sound pickup section can be changed between first directionality by which sounds in the widest region can be picked up and second directionality by which sounds in the narrowest region can be picked up. When the interchangeable lens is in a position which provides the minimum magnification of zoom, the sound processor sets the directionality of the sound pickup section to the first directionality based on the zoom range information. When the interchangeable lens is in a position which provides the maximum magnification of zoom, the sound processor sets the directionality of the sound pickup section to the second directionality based on the zoom range information.

In a second aspect, there is provided an interchangeable lens mountable to a camera body. The interchangeable lens includes a storage section that stores the zoom range information, and a transmitting section that transmits the zoom range information to the camera body.

The camera body and the interchangeable lens in the above aspects enable a user to sense sound zoom more surely regardless of a type of an interchangeable lens (focal length).

BRIEF DESCRIPTION OF DRAWINGS

FIGS. 9A and 9B are graphs for describing a relationship between a focal length of an interchangeable lens and sound zoom to be provided to audio signals.

DETAILED DESCRIPTION OF PREFERRED EMBODIMENTS

Figure 1:
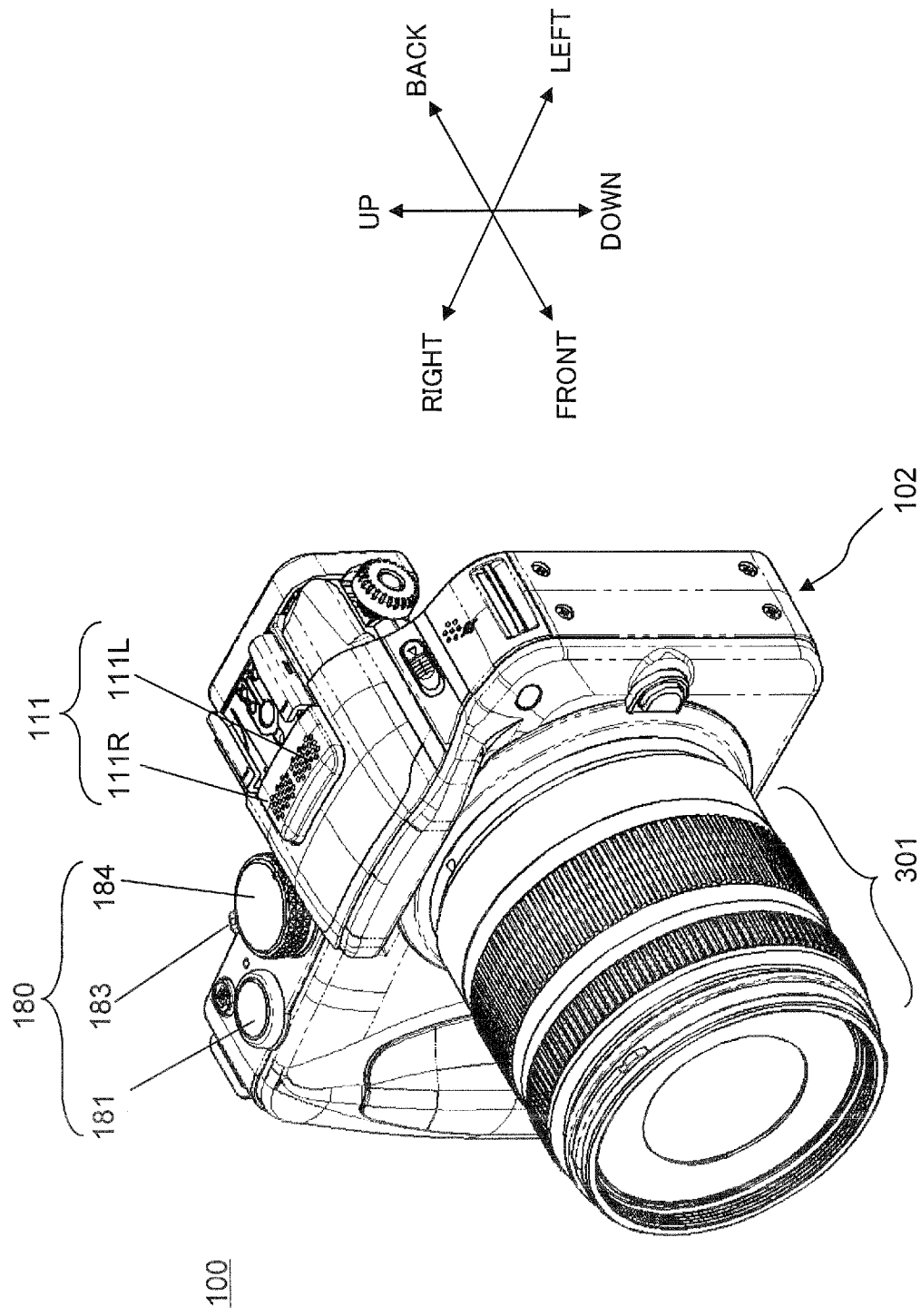
FIG. 1 is a perspective view illustrating a digital camera of the present embodiment.

Embodiments will be described below with reference to the accompanying drawings.

In the drawings to be referred to, like parts or the same parts are designated by like or same reference signs. Some of the drawings are pattern diagrams, and their respective dimensional ratios or the like are different from real ones. Therefore, specific dimensions or the like should be determined with reference to the description in this specification. Needless to say, a dimensional relationship and ratio are different among the respective drawings.

The following embodiments exemplify a digital camera as a camera body having an audio recording function and an interchangeable lens mountable to the camera body.

Further, in the following description, a direction towards a subject with reference to a digital camera 100 in FIG. 1 is "forward direction", and a direction opposite thereto is "a backward direction". A direction to a surface on which an operation section 180 and a microphone section 111 are arranged is "upper direction", and a direction opposite to the upper direction is "lower direction". A direction from a left microphone 111L to a right microphone 111R is "right direction", and a direction opposite to the right direction is "left direction". Further, a posture of the digital camera 100 such that the lower direction of the digital camera 100 matches with a vertical direction is a "normal posture" or a "lateral shooting posture".

1. CONFIGURATION 1-1. Entire Configuration of the Digital Camera

An entire configuration of the digital camera 100 of the present embodiment will be described with reference to FIG. 1. The digital camera 100 is composed of a camera body 102 and an interchangeable lens 301. The camera body 102 has the operation section 180 and the microphone section 111. The operation section 180 includes a release button 181, a power switch 183 and a mode dial 184, and is provided on an upper surface of the camera body 102. The microphone section 111 includes two microphones composed of the left microphone 111L and the right microphone 111R. The left microphone 111L and the right microphone 111R are installed on the upper surface of the camera body 102 and aligned side by side in the left or right direction.

Figure 2:
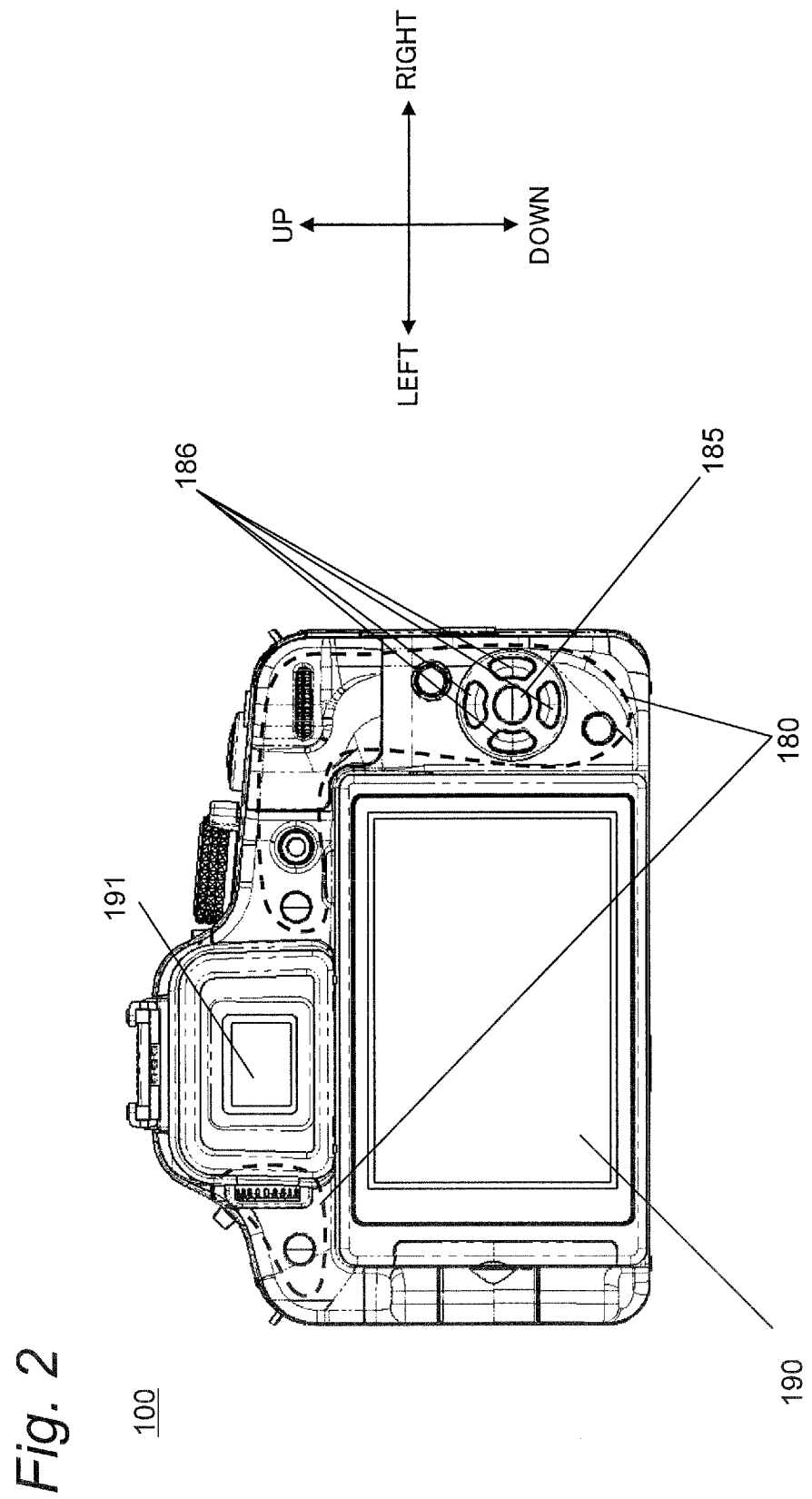
FIG. 2 is a rear view illustrating the digital camera of the present embodiment.

The camera body 102 is provided with the operation section 180 including a center button 185, a cross button 186, and so on, a display section 190 and a view finder 191 on its rear surface, as shown in FIG. 2. The display section 190 is implemented by a liquid crystal display in the present embodiment, but another display device may be used as the display section 190.

1-2. Configuration of Interchangeable Lens

Figure 3:
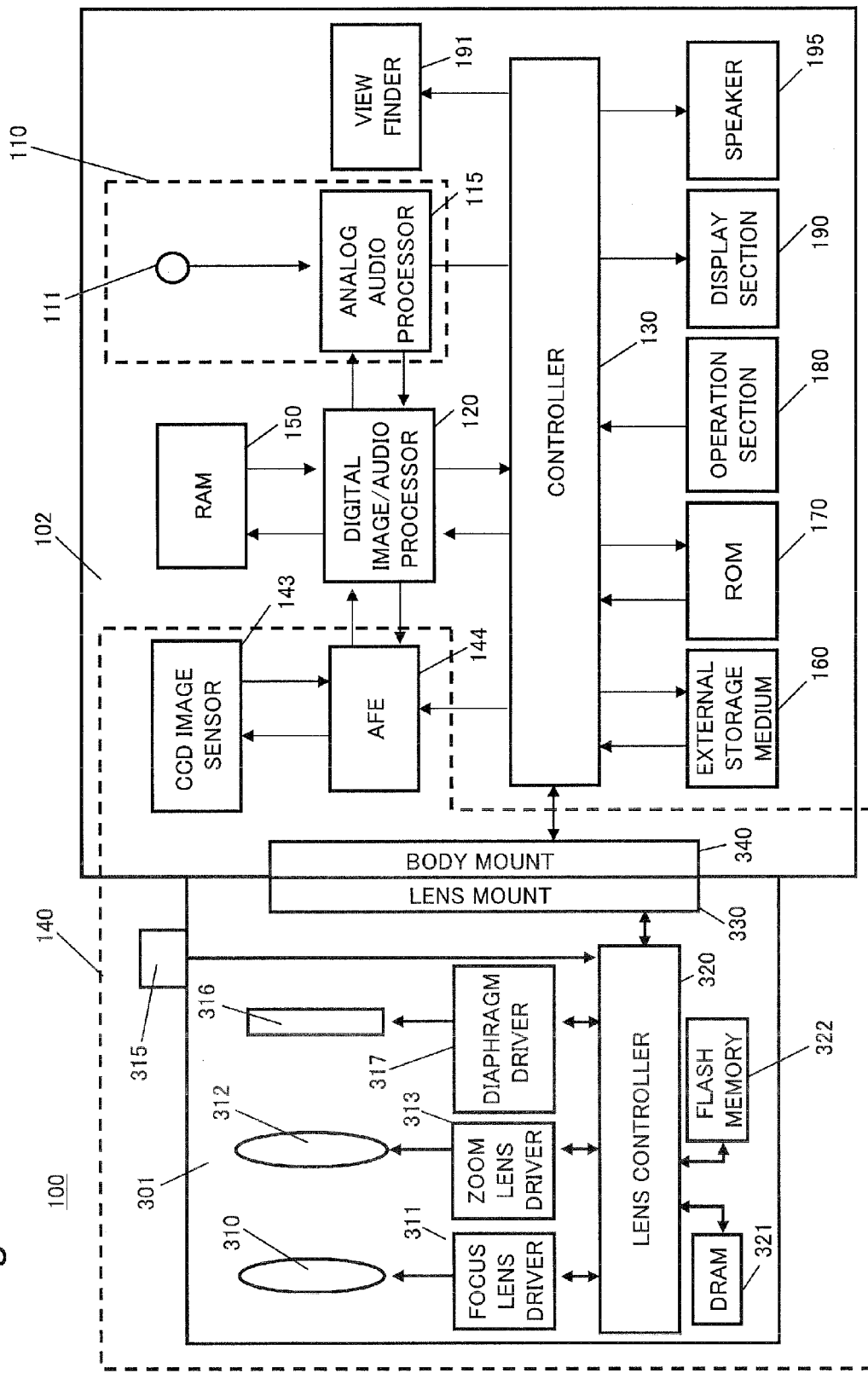
FIG. 3 is a block diagram illustrating an electrical configuration of the digital camera of the present embodiment.

A configuration of the interchangeable lens 301 will be descried with reference to FIG. 3. The interchangeable lens 301 has a plurality of lenses. The interchangeable lens 301 has a lens controller 320, a lens mount 330, an optical system including a focus lens 310 and a zoom lens 312, a diaphragm 316, a focus lens driver 311, a zoom lens driver 313, a diaphragm driver 317, an operation ring 315, a DRAM 321, and a flash memory 322.

The operation ring 315 is an operation member that is installed on an outer surface of the interchangeable lens 301. The operation ring 315 is installed so as to be relatively rotatable with respect to the interchangeable lens 301. A rotating position and a rotating speed of the operation ring 315 are detected by a detector (not shown) and are notified to the lens controller 320.

The lens controller 320 controls the respective sections of the interchangeable lens 301. The lens controller 320 provides instructions to the focus lens driver 311, the zoom lens driver 313 and the diaphragm driver based on operations received by the operation ring 315 and the operation section 180. For example, the lens controller 320 transmits a driving control signal to the zoom lens driver 313 based on the rotating position and the rotating speed notified by the operation ring 315. The zoom lens driver 313 drives the zoom lens 312 according to the driving control signal. Further, the lens controller 320 is connected to the DRAM 321 and the flash memory 322, and thus the lens controller 320 can write information to the DRAM 321 and/or the flash memory 322, and can read information from the DRAM 321 and/or the flash memory 322 as necessary. Further, the lens controller 320 can communicate with a controller 130 via the lens mount 330. The controller 130 may be constituted by a hard-wired electronic circuit, by a microcomputer with a program, and so on.

The lens mount 330 mechanically and electrically connects the interchangeable lens 301 to the camera body 102 in cooperation with a body mount 340 (described later) of the camera body 102. The connection enables the lens controller 320 and the controller 130 to communicate with each other.

The DRAM 321 is used as a work memory when the lens controller 320 makes various controls. Further, the flash memory 322 stores programs, parameters, lens data, and so on that are used by the lens controller 320 when the lens controller 320 makes various controls.

The focus lens 310 is a lens for changing a focus state of a subject image formed on a CCD image sensor 143 via the interchangeable lens 301. The focus lens driver 311 drives the focus lens 310 to cause the focus lens 310 to advance/retreat along an optical axis of the optical system according to a control signal transmitted from the lens controller 320.

The zoom lens 312 is a lens for changing magnification of a subject image formed on the optical system of the interchangeable lens 301. The zoom lens driver 313 drives the zoom lens 312 to cause the zoom lens 312 to advance/retreat along the optical axis of the optical system according to a control signal transmitted from the lens controller 320. The zoom lens 312 and the focus lens 310 may be composed of any number of lenses or any number of lens groups.

The diaphragm 316 is composed of a plurality of mechanical blades that can be opened/closed. The diaphragm 316 is an adjusting member for adjusting an amount of light incident on the CCD image sensor 143 (described later). The diaphragm driver 317 drives the diaphragm 316 to cause the open/close state of the mechanical blades of the diaphragm 316 to change according to a control signal transmitted from the lens controller 320. The diaphragm driver 317, the focus lens driver 311 and the zoom lens driver 313 can be implemented by, for example, a stepping motor, a DC motor or an ultrasonic motor, and so on.

1-3. Configuration of the Digital Camera Body

A configuration of the camera body 102 will be described with reference to FIG. 3. The camera body 102 has the microphone section 111, an analog audio processor 115, a digital image/audio processor 120, the controller 130, the CCD image sensor 143, an analog front end (AFE) 144, a RAM 150, an external storage medium 160, a ROM 170, the operation section 180, the display section 190, the view finder 191, a speaker 195, and the body mount 340.

The interchangeable lens 301, the CCD image sensor 143 and the AFE 144 are collectively called an "image input system" 140. Further, the microphone section 111 and the analog audio processor 115 are collectively called "an audio input system" 110. The image input system 140 and the audio input system 110 may include other components, respectively.

The body mount 340 connects the camera body 102 to the interchangeable lens 301 in cooperation with the lens mount 330 of the interchangeable lens 301, and thus the controller 130 can communicate with the lens controller 320. The body mount 340 receives an exposure synchronizing signal and another control signal from the controller 130, and transmits these signals via the lens mount 330 to the lens controller 320. The body mount 340 transmits the signals received from the lens controller 320 via the lens mount 330 to the controller 130.

The CCD image sensor 143 captures a subject image formed via the interchangeable lens 301 so as to generate image information. A lot of photodiodes are arrayed on a light receiving surface of the CCD image sensor 143 two-dimensionally (in a matrix pattern). Primary-color filters for red (R), green (G) and blue (B) are arranged correspondingly to the respective photodiodes. The primary-color filters for R, G and B are arranged into a predetermined array structure. The light from the subject to be captured passes through the interchangeable lens 301, and then is imaged on the light receiving surface of the CCD image sensor 143. The imaged subject image is converted into color information for respective colors R, G and B according to the amount of the light incident on the respective photodiodes. As a result, image information indicating the entire subject image is generated. The respective photodiodes correspond to pixels of the CCD image sensor 143. However, the color information actually output from the respective photodiodes is primary-color information for any one of R, G and B. For this reason, the colors that should be reproduced on the respective pixels are generated in the digital image/audio processor 120 (described later) at a later stage based on the primary-color information (color and light amount) output from the photodiodes corresponding to the respective pixels and its peripheral photodiodes. When the digital camera 100 is in a shooting mode (described later), the CCD image sensor 143 generates image information about new frame at every constant time.

The APE 144 carries out noise repression by means of correlated double sampling, amplification to an input range width of an A/D converter by means of an analog gain controller, A/D conversion by means of the A/D converter, and so on, on the image information generated by the CCD image sensor 143. Thereafter, the AFE 144 outputs the image information that is subject to these processes to the digital image/audio processor 120.

The microphone section 111 includes the microphones 111L and 111R as described above. The microphones 111L and 111R convert sounds into audio signals as electric signals, and output the audio signals to the analog audio processor 115.

The analog audio processor 115 processes the input audio signals, and carries out A/D-conversion on the audio signals with the A/D converter so as to output the converted signals to the digital image/audio processor 120.

The digital image/audio processor 120 provides various processes to the image information output from the AFE 144 and the audio signals output from the analog audio processor 115 according to instructions from the controller 130. For example, the digital image/audio processor 120 performs gamma correction, white balance correction, scratch correction, an encoding process, and so on, on the image information. Further, the digital image/audio processor 120 executes a computing process on the input audio signal so as to execute a directionality synthesizing process on the audio signals. Details of the directionality synthesizing process will be described later.

The digital image/audio processor 120 may be implemented by a hard-wired electronic circuit, a microcomputer that executes a program, or the like. The digital image/audio processor 120 may be implemented as one semiconductor chip integrally with the controller 130.

The display section 190 displays the image information processed by the digital image/audio processor 120. Images to be displayed by the display section 190 include a through image, a reproduced image, and so on. Images to be displayed by the display section 190 vary according to an operating mode of the digital camera 100.

The digital camera 100 has a shooting mode, a reproducing mode, and so on, as the operating mode. "The shooting mode" is a mode in which image information obtained from a subject image is recorded in the external storage medium 160 or the like. "The reproducing mode" is a mode in which image information recorded in the external storage medium 160 is displayed on the display section 190.

When the digital camera 100 is in the shooting mode and in a standby state (described later) in which a still image is not shot or in a moving image shooting state (described later), the display section 190 displays a through image. A user referring to the through image displayed on the display section 190 can shoot a subject while checking a composition of the subject. "The through image" is generated by the digital image/audio processor 120 based on frame images generated by the CCD image sensor 143 at every constant time. The through image is not recorded in the external storage medium 160 or the like.

When the digital camera 100 is in the reproducing mode, the display section 190 displays a reproduced image. "The reproduced image" is generated based on the image information recorded in the external storage medium 160 or the like. Specifically, the reproduced image is generated in such a manner that the digital image/audio processor 120 reduces high resolution of the recording image recorded in the external storage medium 160 or the like to resolution of the display section 190.

The speaker 195 can output sounds according to audio signals recorded in the external storage medium 160.

The view finder 191 can display contents to be displayed by the display section 190.

The controller 130 controls an entire operation of the digital camera 100. The controller 130 may be implemented by a hard-wired electronic circuit or a microcomputer that executes a program. Further, the controller 130 may be implemented as one semiconductor chip integrally with the digital image/audio processor 120, or the like. The ROM 170 does not have to be provided outside the controller 130 (namely, separated from the controller 130), and may be incorporated into the controller 130.

The ROM 170 stores programs to be used by the controller 130 to perform an auto-focus control (AF control), an automatic exposure control (AE control) of the digital camera 100, a light emission control of an electronic flash, and so on. Further, the ROM 170 stores various conditions and settings relating to the digital camera 100. These various conditions and settings are used by the controller 130 to control the entire operation of the digital camera 100. The ROM 170 can be implemented by a flash ROM or the like.

The RAM 150 is used as a work memory of the digital image/audio processor 120 and the controller 130. The RAM 150 can be implemented by an SDRAM, a flash memory, or the like. The RAM 150 functions as an internal memory for storing image information, audio signals, and so on.

The external storage medium 160 is an external memory containing an nonvolatile recording section such as a flash memory or the like, internally. The external storage medium 160 can record data such as image information, audio signals processed by the digital image/audio processor 120, and so on.

The operation section 180 is a general name of an operation interface such as an operation button, an operation dial, and so on arranged on a case of the digital camera 100, and receives operations from the user. The operation section 180 includes the release button 181, the power switch 183, the mode dial 184, the center button 185, the cross button 186, and so on as shown in FIGS. 1 and 2. When receiving an operation from the user, the operation section 180 transmits a signal indicating a content of the operation to the controller 130.

The release button 181 is a press-type button that can be in two states composed of a half-press state and a full-press state. When the release button 181 becomes in the half-press state, the controller 130 performs the AF control, the AE control and/or the like so as to determine shooting conditions. In the AF control, the digital image/audio processor 120 calculates a contrast value in a predetermined region of the image information. The controller 130 performs a feedback control of the interchangeable lens 301 based on the contrast value to obtain the maximum contrast value. As a result of the AF control, the controller 130 can obtain a focal length up to a subject to be subject to the AF control. Further, as a result of the AF control, the interchangeable lens 301 can image a subject image to be subject to the AF control on the CCD image sensor 143. Thereafter, when the release button 181 becomes in the full-press state, the controller 130 records image information captured at timing of the full press into the external storage medium 160 or the like. In this operation, the image information with high resolution to be recorded in the external storage medium 160 is generated by the digital image/audio processor 120 based on the image information generated by the CCD image sensor 143.

The power switch 183 is a slide-type switch for turning ON/OFF power supply to the respective sections of the digital camera 100. When the power switch 183 is slid right at power-OFF, the controller 130 supplies electric power to the respective sections of the digital camera 100 so as to activate the respective sections. When the power switch 183 is slid left at power-ON, the controller 130 stops the supply of power to the respective sections of the digital camera 100.

The mode dial 184 is a rotation-type dial. When the mode dial 184 is rotated, the controller 130 switches the operating mode of the digital camera 100 according to a current rotating position of the mode dial 184. The operating mode includes, for example, an automatic shooting mode, a manual shooting mode, a scene selecting mode, a reproducing mode, and so on. The automatic shooting mode, the manual shooting mode and the scene selecting mode are generally called "the shooting mode" (described before).

The center button 185 is a press-type button. When the center button 185 is pressed down while the digital camera 100 is in the shooting mode or in the reproducing mode, the controller 130 displays a menu screen on the display section 190. The menu screen is a screen for allowing a user to set various shooting conditions and reproducing conditions. When the center button 185 is pressed down in a state that a value of a setting item on the various conditions is selected on the menu screen, the value of the setting item is determined. The determined value is stored in the ROM 170.

The cross button 186 is composed of four pressing buttons provided in vertical and horizontal directions. The pressing-down of the cross button 186 in any direction enables the values of the setting items displayed on the menu screen to be selected.

The digital camera 100 having such a configuration generates image information from optical information about a subject with the image input system 140, and generates an audio signal from peripheral sounds with the audio input system 110. The generated image information and the audio signal are subject to A/D-conversion and some processes by the digital image/audio processor 120, and then they are recorded in the external storage medium 160 such as a memory card. The image information recorded in the external storage medium 160 is displayed on the display section 190 and/or the view finder 191 according to a user's operation received by the operation section 180. The audio signal recorded in the external storage medium 160 is output through the speaker 195 according to a user's operation. Details of the recording operation of the image information and the audio signals will be described later.

1-4. Correspondence of Terms

The camera body 102 is one example of the camera body. The controller 130 is one example of a receiving section. The microphone section 111 is one example of a sound pickup section. The digital image/audio processor 120 is one example of an audio processor. The interchangeable lens 301 is one example of an interchangeable lens. The flash memory 322 is one example of a storage section. The lens controller 320 is one example of a transmitting section.

2. OPERATION OF THE DIGITAL CAMERA 2-1. Initial Operation

An operation of the digital camera 100 of the present embodiment will be described. When the power switch 183 is operated to power ON the camera body 102 with the interchangeable lens 301 mounted to the camera body 102, the electric power is supplied to the respective sections of the digital camera 100, and various initial settings are carried out.

Figure 4:
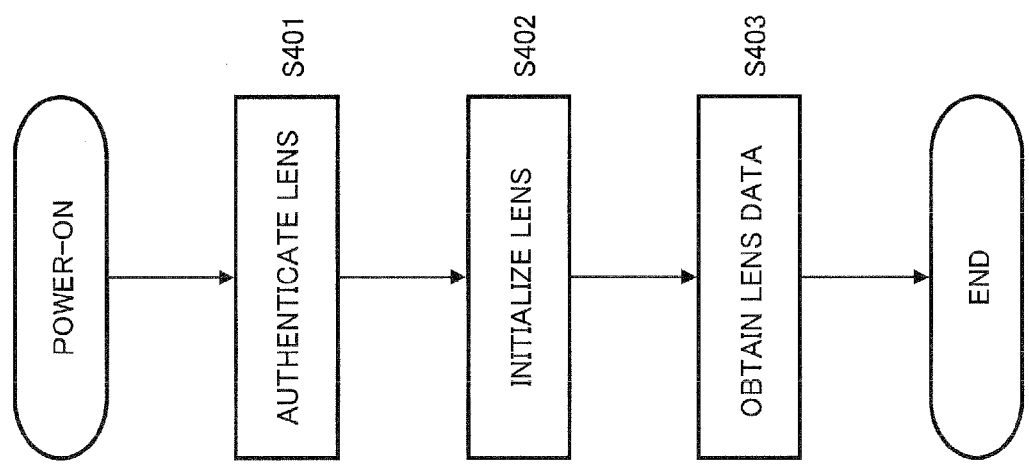
FIG. 4 is a flowchart for describing an initial operation at time of powering on the digital camera of the present embodiment.

An initial operation performed when the camera body 102 is powered ON will be described with reference to FIG. 4. When the power switch 183 of the camera body 102 is turned ON, electric power is supplied to the respective sections of the camera body 102. At the same time, the camera body 102 supplies electric power to the respective sections of the interchangeable lens 301 via the body mount 140 and the lens mount 130.

Subsequently, the controller 130 requests authentication information for the interchangeable lens 301 from the lens controller 320. The authentication information for the interchangeable lens 301 includes identification information of the interchangeable lens, information about a type of the mounted interchangeable lens, and so on. In response to this request, the lens controller 320 transmits the authentication information for the interchangeable lens 301 to the controller 130. The controller 13U obtains the authentication information for the interchangeable lens 301 so as to recognize the type of the interchangeable lens 301 mounted to the camera body 102 (S401).

Subsequently, the controller 130 requests the lens controller 320 to perform an initialization of the interchangeable lens 301. The initializing operation includes resetting of positions of the focus lens 310 and the zoom lens 312, resetting of open/close state of the diaphragm 316, and so on. When receiving the request, the lens controller 320 performs the initializing operation. After the completion of the initializing operation, the lens controller 320 transmits information indicating that the initializing operation is completed to the controller 130. The controller 130 obtains the information indicating the completion of the initializing operation to recognize the initialization of the respective lenses (S402).

Subsequently, the controller 130 requests lens data from the lens controller 320. The lens data is characteristic values specific to the interchangeable lens 301 such as a lens name, a focal length at a lens wide-angle end and a focal length at a lens telephoto end (zoom controllable range), an F number, a focus controllable range, information about the operating members, and so on. The lens data is stored in the flash memory 322 of the interchangeable lens 301. When receiving the request of the lens data, the lens controller 320 reads the lens data from the flash memory 322 and transmits the lens data to the controller 130. As a result, the controller 130 obtains the lens data of the interchangeable lens 301 (S403).

As described above, when data necessary for the camera body 102 and the interchangeable lens 301 are transmitted and received, the initial operation of the camera body 102 and the interchangeable lens 301 are completed.

2-2. Operation in the Moving Image Shooting Mode

An operation in the moving image shooting mode of the digital camera 100 of the present embodiment will be described. The digital camera 100 displays a through image on the display section 190 in a standby state in the moving image shooting mode or a moving image shooting state where a moving image is being shot. The entire operation in the moving image shooting mode will be described below, and then the sound recording operation in the moving image shooting will be described.

Figure 5:
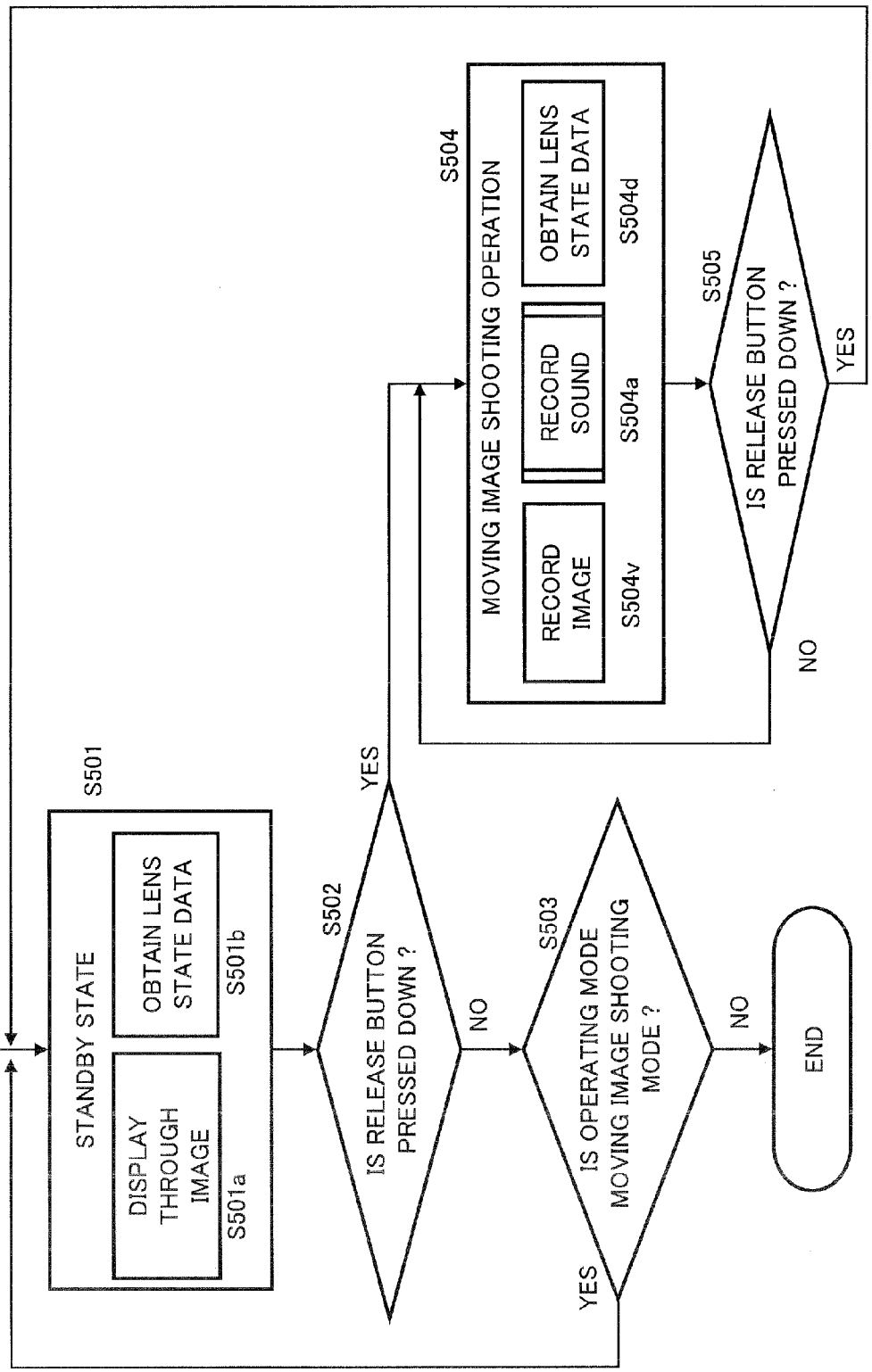
FIG. 5 is a flowchart for describing an operation in a moving image shooting mode of the digital camera of the present embodiment.

The entire operation of the digital camera 100 in the moving image shooting mode will be described with reference to FIG. 5. If the mode dial 184 is set into a state indicating the moving image shooting mode when the power switch 183 of the camera body 102 is operated to power ON the digital camera 100, the digital camera 100 performs the initial operation as shown in FIG. 4, and then shifts to the moving image shooting mode.

The digital camera 100 shifts to the moving image shooting mode and then becomes in the standby state (S501). In the standby state, the controller 130 causes the display section 190 to display the through image output by the digital image/audio processor 120 (S501a). Further, in the standby state, the controller 130 requests lens state data indicating a state of the interchangeable lens 301 from the lens controller 320. The lens state data includes, for example, information about a current focal length of the zoom lens 312, information about a current position of the focus lens 310, information about a current diaphragm value of the diaphragm 316, operation information about the operation ring indicating that the operation ring 315 is operated, and so on. When receiving this request, the lens controller 320 transmits the lens state data to the controller 130 (S501b).

In the standby state, the controller 130 determines whether the release button 181 is pressed down or not.

When determining that the release button 181 is pressed down (Yes at step S502), the controller 130 goes to the moving image shooting operation (S504). The moving image shooting operation includes an image recording operation (S504v), a sound recording operation (S504a), and a lens state data obtaining operation (S504d). In the moving image shooting operation, for example, an operation for recording image information and audio signals at each frame period is performed. A length of the one frame period is an inverse number of the frame rate at time of moving image shooting. For example, when the frame rate is 60 frames/sec., the one frame period is 1/60 second. As the lens state data obtaining operation (S504d), the controller 130 requests the lens state data from the lens controller 320. In response to this request, the lens controller 320 transmits the lens state data to the controller 130. The controller 130 receives the lens state data, and stores the received lens state data into the ROM 170 as required. Since the outline of the image recording operation (S504v) is illustrated in the description of the configuration of the digital camera 100, the description of the image recording operation (S504v) is omitted. Details of the sound recording operation (S504a) will be described later.

After the completion of the moving image shooting operation for one frame period, the controller 130 determines whether the release button 181 is again pressed down or not. When determining that the release button 181 is not pressed down (No at step S505), the controller 130 performs the moving image shooting operation again. On the other hand, when determining that the release button 181 is pressed down (Yes at step S505), the controller 130 goes to the standby state (S501). In this way, the digital camera 100 in the moving image shooting mode performs the moving image shooting operation until the release button 181 is again pressed down after the release button 181 is pressed down.

On the other hand, when determining that the release button 181 is not pressed down (No at step S502) in the standby state, the controller 130 determines whether the operating mode set by the user is the moving image shooting mode or not (S503). When determining that the set operating mode is the moving image shooting mode (Yes at step S503), the controller 130 goes to the standby state (S501). On the other hand, when determining that the set operating mode is not the moving image shooting mode (No at step S503), the controller 130 ends the moving image shooting mode.

2-3. Sound Recording Operation

The digital camera 100 has a sound zoom function. An operation for realizing the sound zoom function is performed in the sound recording operation.

The sound zoom function of the digital camera 100 will be described below. "The sound zoom function" is a function for changing a sound pickup property of the audio input system 110 in cooperation with zoom magnification of the interchangeable lens 301. The sound zoom function is implemented by the directionality synthesizing process executed on the input audio signals by the digital image/audio processor 120. The sound zoom function can provide the user with a sense of stereo and a sense of zoom in an acoustic manner at time of reproducing audio according to a change in the zoom magnification (optical view angle) of the interchangeable lens. "The sense of stereo" means that the user feels as if sounds are produced around the user. "The sense of zoom" means that the user feels as if far sounds are produced near the user.

In the directionality synthesizing process, the directionality can be changed from directionality for enabling sound pickup in the narrowest range, namely, for giving the sense of maximum zoom (a limit of the directionality for this is "a sound telephoto end") to directionality for enabling sound pickup in the widest range, namely, for giving a highest sense of stereo (a limit of the directionality for this is "a sound wide end").

Figure 6:
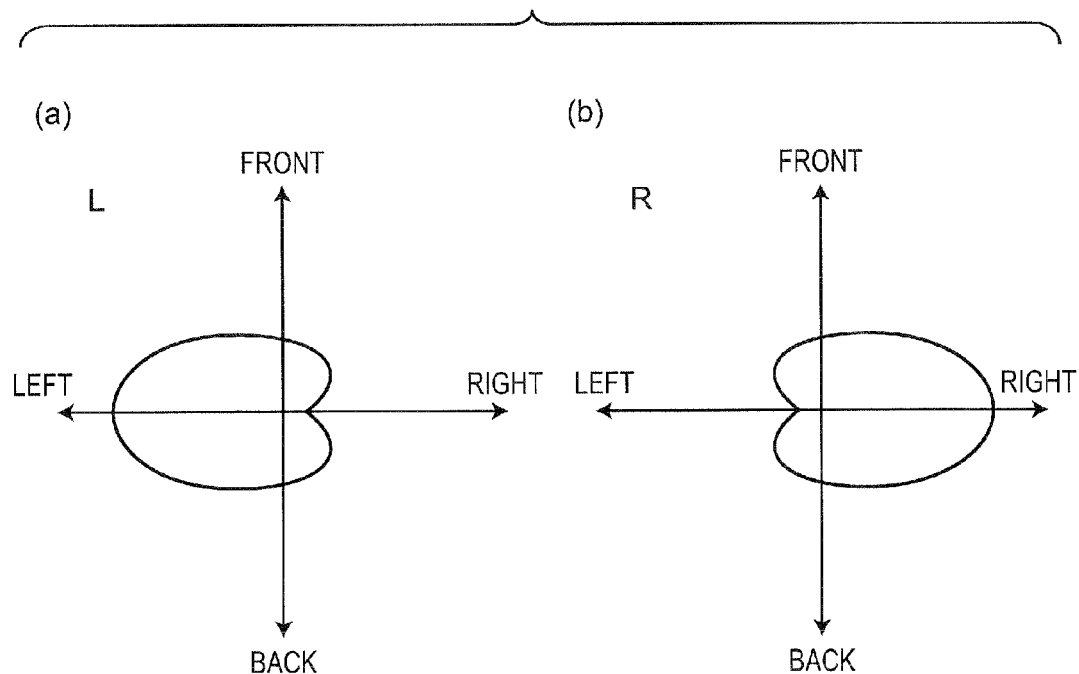
FIG. 6 is a diagram illustrating a directionality of a microphone section at a sound wide end.
Figure 7:
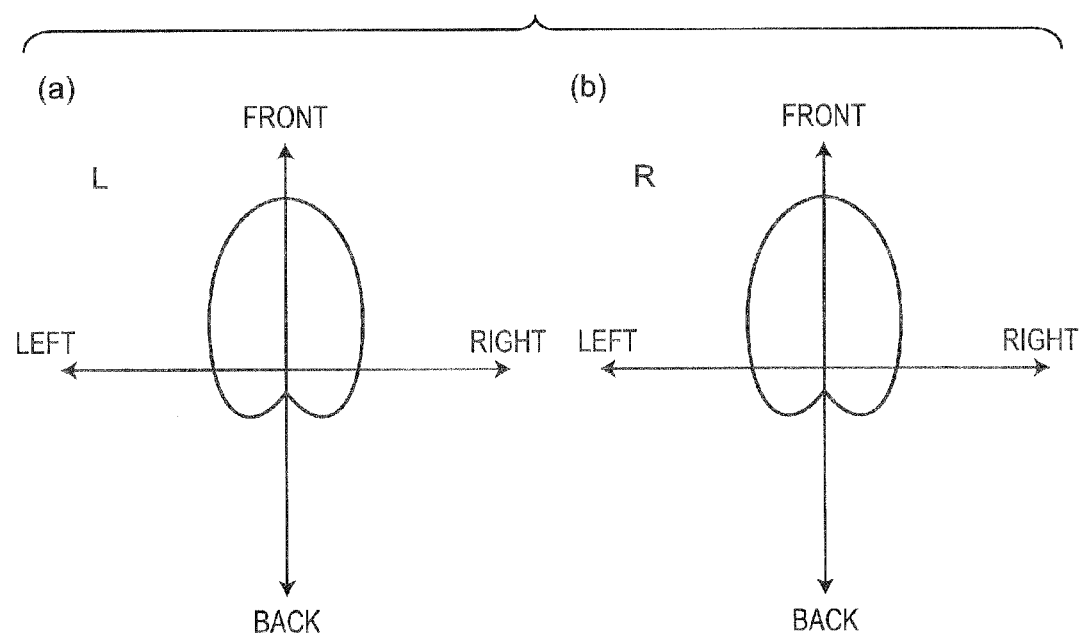
FIG. 7 is a diagram illustrating the directionality of the microphone section at a sound telephoto end.

FIGS. 6 and 7 are diagrams describing the directionality in the directionality synthesizing process to be set in the sound zoom function. FIG. 6 illustrates the directionality at the sound wide end where sounds can be picked up in the widest range. FIG. 7 illustrates the directionality at the sound telephoto end where sounds can be picked up in the narrowest range.

FIGS. 6(a) and 7(a) illustrate the directionality relating to an input of the left microphone 111L, and FIGS. 6(b) and 7(b) illustrate the directionality relating to an input of the right microphone 111R. When the sound zoom (the directionality) is set to the sound wide end, as shown in FIG. 6, the highest sense of stereo is provided to audio signals and thus the directionality of the right and left directions is increased. On the other hand, when the sound zoom is set to the sound telephoto end, as shown in FIG. 7, the highest sense of zoom is provided to audio signals and thus the directionality of the right and left directions is reduced and the directionality in the forward direction is increased. Alternatively, in order to provide the highest sense of zoom to audio signals, a low frequency and a high frequency of the audio signals are also reduced, a middle frequency is increased, and a sound volume is increased. It is noted that various generally known art relating to the sound zoom are present (for example, see US2002/0064287A1). In the present embodiment, a level of the sound zoom (the directionality) can be changed linearly between the sound zoom wide end and the sound zoom telephoto end.

Figure 8:
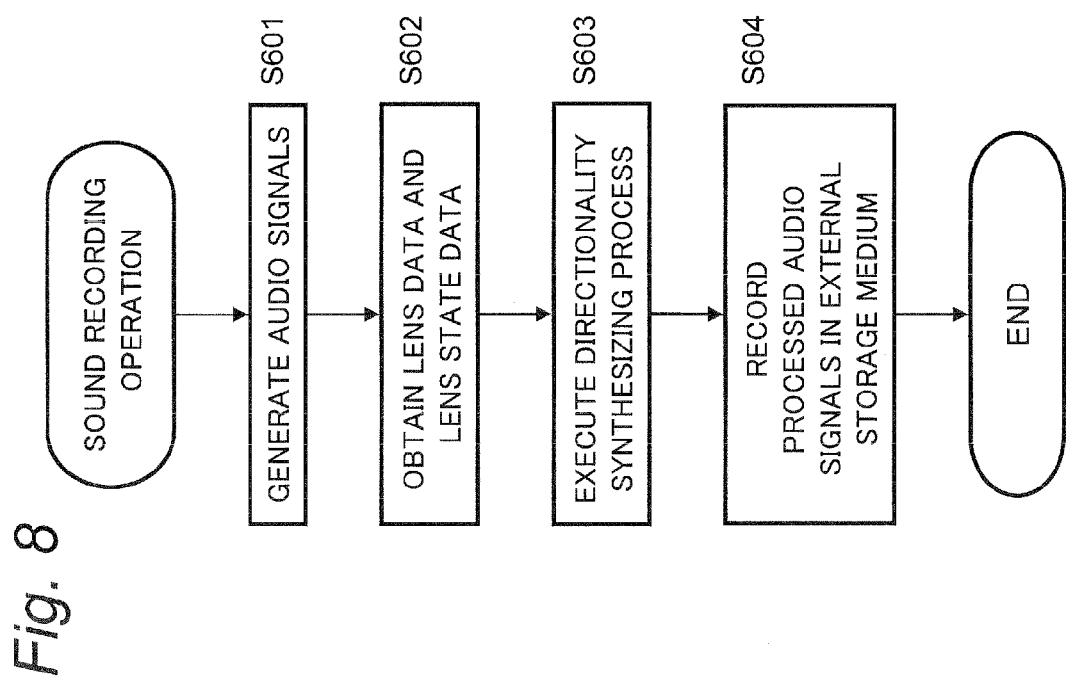
FIG. 8 is a flowchart for describing an sound recording operation of the digital camera of the present embodiment.

The sound recording operation (S504a) described in FIG. 4 will be described with reference to FIG. 8. After the analog audio processor 115 executes various analog signal processes on audio signals input by the microphone section 111, the analog audio processor 115 outputs the processed audio signals to the digital image/audio processor 120 (S601).

Subsequently, the controller 130 reads the lens data and the lens state data from the ROM 170 (S602). The lens data includes information about the focal length at the lens wide end and information about the focal length at the lens telephoto end, which are specific to the interchangeable lens 301. The lens state data includes information about a current focal length and/or information about a current zoom magnification. The controller 130 inputs these pieces of information into the digital image/audio processor 120.

The digital image/audio processor 120 executes the directionality synthesizing process on the audio signals based on the input lens data and lens state data (S603). The directionality synthesizing process is a process which synthesizes the input audio signals to adjust the directionality of the audio signals with the digital image/audio processor 120. Adjusting the directionality of the audio signals achieves the sound zoom function. Details of the adjustment of the directionality will be described later.

The audio signals subject to the directionality synthesizing process in the digital image/audio processor 120 are recorded in the external storage medium 160 (S604).

The directionality synthesizing process to be executed on audio signals will be described below. When the current focal length of the interchangeable lens 301 is positioned at the lens wide end, the digital image/audio processor 120 executes the directionality synthesizing process so that the sound zoom effect (a result of the directionality synthesizing process) at the sound wide end can be obtained. Specifically, the digital image/audio processor 120 sets the directionality in the directionality synthesizing process to characteristics shown in FIGS. 6(*a*) and 6(*b*). On the other hand, when the current focal length of the interchangeable lens 301 is positioned at the lens telephoto end, the digital image/audio processor 120 executes the directionality synthesizing process so that the sound zoom effect at the sound telephoto end can be obtained. Specifically, the digital image/audio processor 120 sets the directionality in directionality synthesizing process to characteristics shown in FIGS. 7(*a*) and 7(*b*). When the current focal length of the interchangeable lens 301 is positioned between the lens wide end and the lens telephoto end, the level of the sound zoom is adjusted in proportion to the current focal length. That is to say, the digital image/audio processor 120 executes the directionality synthesizing process to cause the level of the sound zoom between the sound wide end and the sound telephoto end to correspond to a position of the focal length of the interchangeable lens 301 between the lens wide end and the lens telephoto end. A relationship between the focal length of the interchangeable lens 301 and the sound zoom will be described below.

A relationship between the focal length of the interchangeable lens 301 and the sound zoom effect to be provided to audio signals will be described with reference to graphs of FIGS. 9A and 9B. A horizontal axis represents the current focal length (optical zoom) of the interchangeable lens 301. A capturing range (field angle) becomes wider towards the left side (lens wide side), and the capturing range becomes narrower towards the right side (lens telephoto side). A vertical axis represents a level of the sound zoom effect (a result of the directionality synthesizing process). The stereo effect of acoustic sense becomes higher towards a down side (the sound wide end side), and the zoom effect of acoustic sense becomes higher towards an upper side (the sound telephoto end side). FIG. 9A is a diagram for describing the sound zoom effect set for the interchangeable lens 301 having the focal length settable range from 14 mm (the lens wide end) to 45 mm (the lens telephoto end). FIG. 9B is a diagram for describing the sound zoom effect set for the interchangeable lens 301 having the focal length settable range of the interchangeable lens 301 from 45 mm (the lens wide end) to 200 mm (the lens telephoto end).

In the case of FIG. 9A, the minimum focal length 14 mm (the lens wide end) of the interchangeable lens 301 is related to the sound wide end (W end) of the sound zoom, and the maximum focal length 45 mm (the lens telephoto end) of the interchangeable lens 301 is related with the sound telephoto end (T end) of the sound zoom. On the other hand, in the case of FIG. 9B, the minimum focal length 45 mm (the lens wide end) of the interchangeable lens 301 is related to the sound wide end (W end) of the sound zoom, and the maximum focal length 200 mm (the lens telephoto end) of the interchangeable lens 301 is related to the sound telephoto end (T end) of the sound zoom.

In this way, the sound telephoto end of the sound zoom is related to the maximum focal length of the interchangeable lens 301, and the sound wide end of the sound zoom is related to the minimum focal length, regardless of a type of the interchangeable lens 301. That is to say, as is clear from FIGS. 9A and 9B, even when the focal length of the interchangeable lens 301 is set to the same value of 45 mm, the level of the sound zoom provided to audio signals is different between the case where the focal length corresponds to the lens wide end and the case where the focal length corresponds to the lens telephoto end.

In the respective cases of FIGS. 9A and 9B, when the focal length of the interchangeable lens 301 is set between the lens wide end and the lens telephoto end, the relative level of the sound zoom with respect to the sound wide end and the sound telephoto end is determined according to a relative position of the focal length with respect to the lens wide end and the lens telephoto end.

In the digital camera 100 according to the present embodiment, the sound zoom is implemented with linearly interpolating the sound wide end and the sound telephoto end. However, the sound zoom may be implemented with an interpolation method other than the linear interpolation.

As described above, both ends of the optical zoom of the interchangeable lens 301 are related to both ends of the sound zoom, and thus the sound zoom can be used to the utmost limit even when the focal length settable range of the interchangeable lens 301 is different. As a result, the user can surely sense the sound zoom effect regardless of a type of the lens.

3. CONCLUSION OF THE PRESENT EMBODIMENT

The camera body 102 of the present embodiment is the camera body to which the interchangeable lens 301 capable changing zoom magnification is mountable. The camera body 102 includes the controller 130 that receives the lens data which is information indicating the range of the zoom magnification that can be provided by the interchangeable lens 301 from the interchangeable lens 301, the microphone section 111 that picks up sounds to generate audio data, and the digital image/audio processor 120 that changes settings relating to directionality of the microphone section 111 in conjunction with the zoom magnification of the interchangeable lens 301. The lens data includes information corresponding to the maximum magnification and the minimum magnification that can be provided by the interchangeable lens 301. The directionality of the microphone section 111 can be changed between the sound wide end by which sounds in the widest range can be picked up and the sound telephoto end by which sounds in the narrowest range can be picked up. When the interchangeable lens 301 is in a position which provides the minimum magnification of zoom, the digital image/audio processor 120 sets the directionality of the microphone section 111 to the sound wide end based on the lens data. When the interchangeable lens 301 is in a position which provides the maximum magnification of zoom, the digital image/audio processor 120 sets the directionality of the microphone section 111 to the sound telephoto end based on the lens data.

Further, the interchangeable lens 301 of the present embodiment is the interchangeable lens mountable to the camera body 102. The interchangeable lens 301 comprises the flash memory 322 that stores the lens data, and the lens controller 320 that transmits the lens data to the camera body 102.

According to the camera body 102 and the interchangeable lens 301 having such a configuration, the user can surely sense the sound zoom regardless of the settable focal length range of the zoom lens.

4. OTHER EMBODIMENTS

The embodiment is not limited to the above embodiment, and various embodiments can be considered. Other embodiments will be described below together.

In the above embodiment, the controller 130 obtains information about the focal length as an absolute value from the interchangeable lens 301. However, a relative value may be obtained as information about the focal length. For example, the information about a value of the zoom magnification of the interchangeable lens 301 at the telephoto end with respect to the wide-angle end is obtained as the lens data, and the current value of the zoom magnification of the interchangeable lens 301 with respect to the wide-angle end may be obtained as the lens state data.

Further, the camera of the present embodiment includes two microphones. However, an idea of the above embodiment may be applied to the camera having three or more microphones. In this case a plurality of the microphones are appropriately arranged and signals are processed so that the directionality of the audio signals can be adjusted.

Further, the above embodiment exemplifies the digital camera 100 as the camera. However, any device that can be lens-changeable and shoot moving images may be used. For example, the idea of the above embodiment can be applied also to video cameras.

Further, the above embodiment describes the functions and the configurations for each of the digital image/audio processor 120 and the controller 130. However, the configuration and/or the function of one of the digital image/audio processor 120 and the controller 130 may be included or implemented in the other one.

Further, the above embodiment exemplifies the CCD image sensor 143 as an imaging device. However, the imaging device is not limited thereto. A CMOS image sensor, an NMOS image sensor or the like may be used as the imaging device.

Further, the above embodiment exemplifies the interchangeable lens having the focus lens, the zoom lens and the diaphragm. However, the idea of the above embodiment can be applied to the camera bodies to which the interchangeable lens having at least the zoom lens is mounted.

INDUSTRIAL APPLICABILITY

The idea of the above embodiment can be applied to an imaging apparatus (the digital camera, a movie camera, or the like) having the sound recording function.

What is claimed is:

1. A camera body to which a plurality of different types of interchangeable lenses with different zoom characteristics for changing zoom magnification are mountable, comprising:
   a receiving section operable to receive zoom range information from an interchangeable lens, the zoom range information indicating a range of a zoom magnification that can be provided by the interchangeable lens;
   a sound pickup section operable to pick up sound used to generate audio data; and
   a sound processor operable to change a setting relating to a directionality of the sound pickup section in conjunction with a change of the zoom magnification of the interchangeable lens, wherein:
   the zoom range information is specific to the interchangeable lens and is pre-stored in the interchangeable lens, and the zoom range information includes information corresponding to a maximum magnification and a minimum magnification that can be provided by the interchangeable lens,
   the directionality of the sound pickup section can be changed between a first directionality by which a sound in the widest region can be picked up and a second directionality by which a sound in the narrowest region can be picked up,
   the sound processor sets a directionality of the sound pickup section corresponding to the minimum magnification of zoom indicated by the zoom range information to the first directionality, and sets a directionality of the sound pickup section corresponding to the maximum magnification of zoom indicated by the zoom range information to the second directionality, based on the zoom range information; and
   the sound processor is operable to set different first and second directionalities of the sound pickup section for the different types of the plurality of interchangeable lenses having different zoom characteristics.

2. The camera body according to claim 1, wherein the zoom range information includes information indicating a view angle of the interchangeable lens.

3. A camera system comprising:
   the camera body according to claim 2; and
   the interchangeable lens mountable to the camera body, the interchangeable lens including:
      a storage section operable to store zoom range information; and
      a transmitting section operable to transmit the zoom range information to the camera body.

4. The camera body according to claim 1, wherein the zoom range information includes information indicating a value of the maximum zoom magnification that can be provided by the interchangeable lens.

5. A camera system comprising:
   the camera body according to claim 4; and
   the interchangeable lens mountable to the camera body, the interchangeable lens including:
      a storage section operable to store the zoom range information;
      a transmitting section operable to transmit the zoom range information to the camera body.

6. A camera system comprising:
   the camera body according to claim 1; and
   the interchangeable lens mountable to the camera body, the interchangeable lens including:
      a storage section operable to store the zoom range information; and
      a transmitting section operable to transmit the zoom range information to the camera body.

7. The camera body according to claim 1, wherein the directionality of the sound pickup section in left and right directions with respect to an object to be imaged is increased in the first directionality compared to the second directionality, and the directionality of the sound pickup section in a forward direction with respect to the object to be imaged is increased in the second directionality compared to the first directionality.

* * * * *